United States Patent Office 3,335,571
Patented Aug. 15, 1967

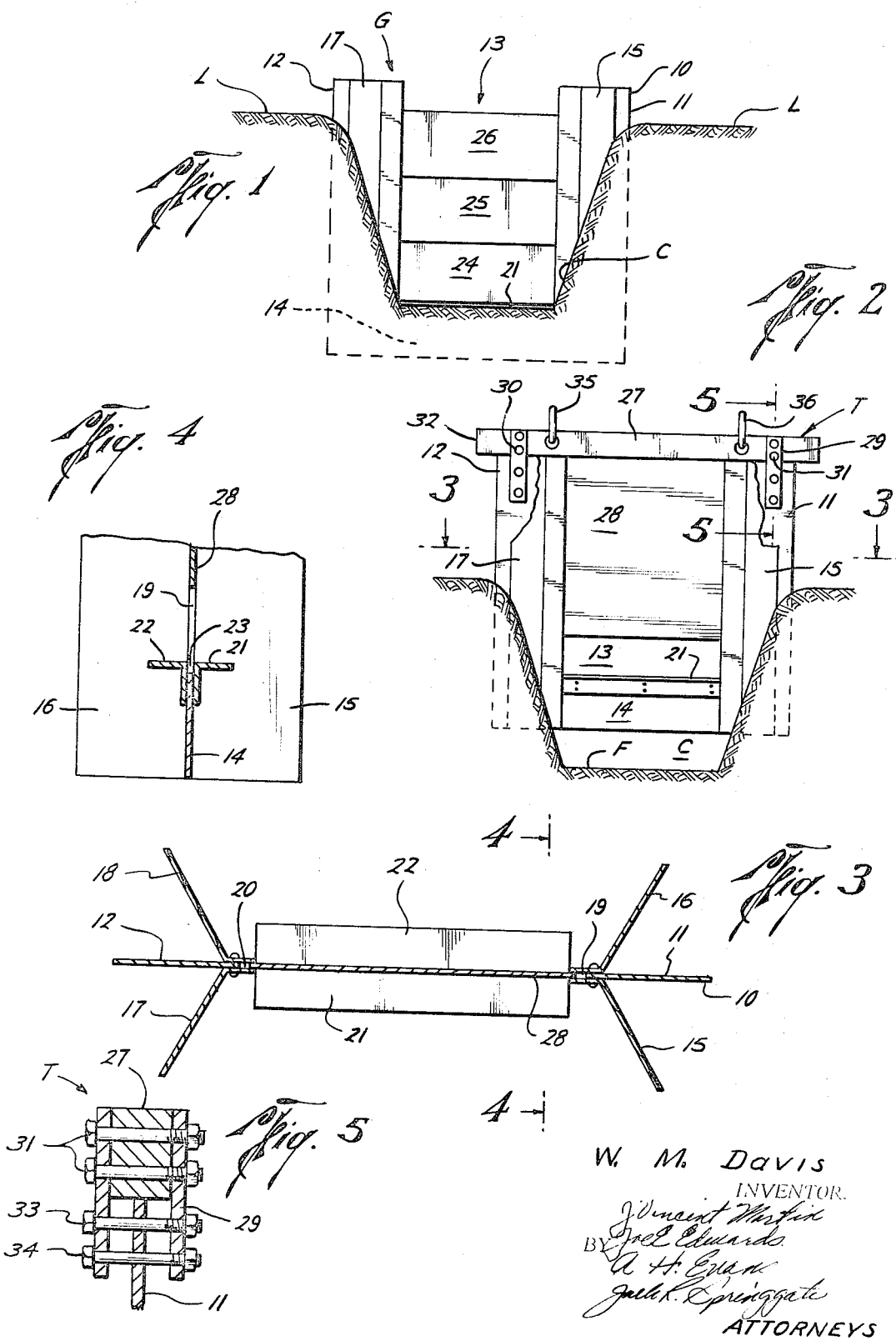

3,335,571
IRRIGATION GATES AND METHOD OF
INSTALLATION
W. M. Davis, Star Rte., Box 67, Liberty, Tex. 77575
Filed May 14, 1965, Ser. No. 455,728
6 Claims. (Cl. 61—28)

ABSTRACT OF THE DISCLOSURE

An irrigation gate including a U-shaped member having upstanding legs and a base, wings connected to the U-shaped member so that their inner ends form a track at the inner edge of said legs, gate elements adapted to be positioned in the tracks and an installation tool adapted to be positioned in the tracks to protect the U-shaped member during installation. This abstract is neither intended to define the invention of the application which, of course, is measured by the claims, nor is it intended to be limiting as to the scope of the invention in any way.

The present invention relates to irrigation gates and to the method and apparatus used to install such gates. More specifically, the present invention relates to an irrigation gate which is used to control the flow of water through a channel defined by the banks of a levee around a field and to the method and apparatus for installing such irrigation gate.

In the growing of rice and other crops it is often desirable and necessary to flood the field in which the crops have been planted. It is also desirable to be able to maintain certain levels of water in such fields at different times depending upon the stage of growth of the crop. Generally, such fields are surrounded by a mound of earth which acts as a levee to retain the water in the field. In the past when it was desired to drain such fields, channels were manually cut in each levee to allow the water to drain into the adjoining field or into a suitable channel. This manual movement of the earth of the levee is a double job as it must be replaced when it is again desired to flood the field. Further, since it is always desirable to maintain a certain level of water in such fields, such levels have been maintained in the past by controlling the amount of water pumped into the field. An irrigation gate should be easily installed, be able to support the water to be contained in the field, have a definite way of establishing the level and be relatively inexpensive.

An object of the present invention is to provide an irrigation gate which is relatively inexpensive and easily installed and which will control the level of water in a field.

Another object of the present invention is to provide a method of installing an irrigation gate in a channel cut through a levee without warping, bending or damaging such gate and to assure that the lowest opening through the gate is at ground level.

A further object of the present invention is to provide a tool for the installation of an inexpensive irrigation gate, which tool will allow the installation by pounding with a suitable device and will protect the gate structure from damage and distortion due to such pounding.

Still another object of the present invention is to provide an irrigation gate which is readily installed and is provided with suitable wings for stability to hold the water pressure which may build up against the gate when installed.

A still further object of the present invention is to provide an irrigation gate which may be readily installed and which is provided stop means defining the limit to which said gate may be driven into the ground during installation.

These and other objects of the present invention are hereinafter more fully explained and described, together with the other details of the present invention in relation to the drawings wherein:

FIGURE 1 is an elevation view of the irrigation gate of the present invention installed across a channel cut through a levee surrounding a field.

FIGURE 2 is an elevation view of the irrigation gate of the present invention positioned for installation across a channel cut through a levee and including the installation tool of the present invention.

FIGURE 3 is a sectional view of the irrigation gate taken along lines 3—3 in FIGURE 2.

FIGURE 4 is another sectional view of the irrigation gate taken along lines 4—4 in FIGURE 3.

FIGURE 5 is another sectional view of the installation tool of the present invention taken along lines 5—5 in FIGURE 2.

As shown in FIGURE 1, the irrigation gate G of the present invention is installed across the channel C which extends through the levee L. It should be noted that as shown in the broken lines, the structure of the gate G is positioned in the adjacent ends of the levee L defining the channel C and also extends downwardly into the ground to a level below the field level F. If a channel is not available, one is readily formed by removing sufficient dirt from the levee L to provide the channel C of the desired width and depth.

The irrigation gate G as shown includes the U-shaped member 10 having upstanding legs 11 and 12 defining the spillway 13 therebetween and base 14 connecting across the bottom of the legs 11 and 12. Wing members 15 and 16 are secured to leg 11 with member 15 extending outwardly in front of leg 11 and member 16 extending outwardly behind leg 11. Wing members 17 and 18 are similarly secured to leg 12. Each of the wing members has two portions, a securing portion adapted to lay flat against the U-shaped member 10 and an outwardly flaring portion which is adapted to provide stability for the irrigation gate G of the present invention when it is installed as shown in FIGURE 1. The inner portion of each of the wing members extends inwardly beyond the inner edges of legs 11 and 12 to form the tracks 19 and 20.

The angles 21 and 22 are secured to the base 14 of U-shaped member 10, as best shown in FIGURE 4. The upper edge of angles 21 and 22 extends above the upper edge of base 14 to form the track 23. Further, the outwardly projecting flanges of the angles 21 and 22 will rest upon the ground which defines the field level F and will thereby locate the lower edge of the spillway 13 when the gate G is installed.

Water is retained by the irrigation gate G of the present invention by the insertion of the gate elements 24, 25 and 26 to close the spillway 13 to a level at which it is desired to retain the water in the field surrounded by the levee L. The element 24 is inserted from the top of the U-shaped member 10 with one end in the track 19 and the other end in the track 20, and is lowered until its lower edge rests against the upper edge of base 14 within the track 23. The elements 25 and 26 are installed sequentially in a similar manner and lowered until they rest against the top of the next lower element.

Many of the devices which have been used as irrigation gates in the past have been difficult to install, or, when installed, have not had the necessary stability or have been warped, damaged or otherwise deformed during installation so that they are no longer suitable for use as an irrigation gate. It is necessary that the irrigation gate G be maintained in its normal condition and shape during installation and for that purpose the installation tool T, as shown in FIGURE 2, has been provided. Tool T includes the bar 27, the plate 28 which is secured to the underside of the bar 27 by welding or other suitable means and the pairs of reinforcing brackets 29 and 30 which are positioned outwardly on the bar 27 from the plate 28. The bar 27 should be sufficiently strong to receive the impact blows of installation and protect the gate G from damage while it is driven into the ground. The details of the tool T are best seen from FIGURES 2 and 5.

When installed, the bar 27 will rest upon the top edge of the legs 11 and 12 of U-shaped member 10. Plate 28 will extend downwardly from the bar 27 with its side edges positioned in the tracks 19 and 20. With the tool T in this position and the brackets 29 and 30 secured to the bar 27 by the bolts 31 and 32, the individual arms of each bracket will extend downwardly on opposite sides of the U-shaped member 10. Two holes are provided near the top of each leg of member 10 through which suitable securing means, such as the bolts 33 and 34 as shown in FIGURE 5, extend to secure the brackets to the member 10. With the tool T thus assembled with the irrigation gate G, the whole assembly will be placed across the channel C in a position generally illustrated in FIGURE 2, it being understood that the initial penetration into the levee L may result from the weight of the assembly or from being pushed to such position by the person installing the gate. Thereafter, the assembly is driven to the position illustrated in FIGURE 1 by striking the bar 27 with a suitable hammer or maul.

The installation of the gate G is completed when the underside of the outwardly extending flanges of angles 21 and 22 rests against the surface F. The gate G will be protected from damage during installation by the tool T since all blows of the hammer or maul are directed against the bar 27 of the tool T. Distortion of the gate G is prevented by the engagement of the plate 28 of tool T within the tracks 19 and 20 and further by the engagement of the member 10 by reinforcing brackets 29 and 30. Thus at all times during installation the gate G is protected from damage by the reinforcement provided by tool T. The bolts 33 and 34 extend through the arms of the brackets 29 and through the holes in the legs of the member 10 so that they will provide support for the legs and also will transmit a portion of the force to the legs. After installation is complete, the tool T is removed from the gate G by lifting on the rings 35, 36. Thereafter the gate elements 24, 25 and 26 are inserted into the gate G to the height desired.

From the foregoing it can be seen that the irrigation gate of the present invention is relatively simple to build, install and also comparatively inexpensive since it does not have to be constructed of heavy materials to withstand the impacts of installation. Also, the method of installing the irrigation gate of the present invention is such that it will protect the gate and assure the penetration of the gate to the proper depth in the ground. The installation tool used in conjunction with the irrigation gate to provide support for the gate absorbs the impacts of installation and transmits such impacts to the gate without damaging or distorting the gate.

What is claimed is:

1. The method of installing an irrigation gate structure comprising, removing dirt from a levee to form a channel through the levee, placing the irrigation gate structure having an opening therethrough in position across said channel with the bottom ends of said gate structure positioned in the levee at each side of said channel and with side legs thereof extending upwardly from said ends in spaced relation to define said opening and to provide seats for receiving a gate element for closing said opening, inserting and securing a rigid installation tool into said seats to fix the spacing thereof for the gate element and with said tool spanning the top ends of said side legs, imparting driving force to the top of said tool with sufficient amount for driving said legs and bottom ends of said gate structure into said levee on each side of said channel whereby said gate structure is protected from damage, and thereafter removing said installation tool from said gate structure and inserting a gate element into said seats to a height at which water is to be maintained.

2. An irrigation gate comprising, a U-shaped member, said member having upstanding legs and a base connecting the lower ends of said legs, a pair of wings attached to the legs of said U-shaped member and extending substantially the entire length of said leg, one of each pair of said wings extending angularly outward toward the front of said member, the other of each pair of said wings extending angularly outward toward the rear of said member, a pair of angles secured to said member across its base, and a gate element adapted to fit in the opening of said member, said member adapted to be driven into the ground across a channel to a level at which said angles rest on the bottom of the channel between said adjacent banks, the inner ends of said wings extend inwardly beyond the inner edge of said legs forming a track between said inner ends of said wings at the inner edge of the legs of said member whereby said gate elements are received and retained in said tracks.

3. An irrigation gate according to claim 2 wherein, said angles extend above the upper edge of said base to form a lower track to receive said gate element.

4. An irrigation gate according to claim 2 including, a bar, a plate secured to said bar and adapted to be positioned in the opening of said U-shaped member during installation, two pairs of reinforcing brackets secured to said bar near the ends of said bar, and means securing said brackets to the legs of said U-shaped member whereby said gate may be installed across a channel formed between adjacent banks by pounding on said tool, said bar and plate reinforcing and protecting said member and maintaining alignment and spacing of said opening in said member during the installation of said gate.

5. A gate according to claim 4 wherein said bar is sufficiently strong to receive blows of a maul during installation and transmit the force of such blows to said gate while protecting said gate from damage and distortion.

6. A gate according to claim 4 wherein said plate of said tool when installed in said gate fits in the gate element receiving tracks of said gate and thereby protects said tracks and the spillway opening of such gate during installation.

References Cited

UNITED STATES PATENTS

| 602,973 | 4/1898 | Buttorff | 61—29 |
| 853,168 | 5/1907 | Garbe. | |
| 1,206,938 | 12/1916 | Stimmel et al. | |
| 1,771,112 | 7/1930 | Dorazio | 61—29 |
| 2,042,350 | 5/1936 | McGuire | 61—28 |
| 2,415,332 | 2/1947 | Blackmore | 61—29 |

EARL J. WITMER, *Primary Examiner.*